United States Patent
Rohlfing et al.

(10) Patent No.: US 6,695,462 B2
(45) Date of Patent: Feb. 24, 2004

(54) LIGHTING INSTALLATION, IN PARTICULAR AS A DANGER LIGHT, OBSTRUCTION LIGHT OR DAYTIME AND NIGHT-TIME MARKER

(75) Inventors: Ralph Rohlfing, Weyhe (DE); Wolfgang Serfass, Bremen (DE)

(73) Assignee: aqua signal Aktiengesellschaft Spezialleuchtenfabrik, Bremen (DE)

( * ) Notice: Subject to any disclaimer, the term of this patent is extended or adjusted under 35 U.S.C. 154(b) by 14 days.

(21) Appl. No.: 09/946,106

(22) Filed: Sep. 4, 2001

(65) Prior Publication Data

US 2002/0093823 A1 Jul. 18, 2002

(30) Foreign Application Priority Data

Aug. 31, 2001 (DE) ....................... 201 14 306 U (51) Int. Cl.[7] .................................. F21V 5/00
(52) U.S. Cl. .............. 362/328; 362/216; 362/241; 362/296; 362/800; 340/981
(58) Field of Search ................. 362/328, 240, 362/296, 800, 241, 216; 340/981

(56) References Cited

U.S. PATENT DOCUMENTS 6,278,382 B1 * 8/2001 DeMarco et al. ............ 362/240
6,334,700 B2 * 1/2002 Ramer et al. ............... 362/800

FOREIGN PATENT DOCUMENTS

| CH | 185517 | 10/1936 |
|---|---|---|
| DE | 850 731 | 9/1952 |
| DE | 1 566 856 | 4/1970 |
| DE | 76 26 398 | 2/1977 |
| DE | 97 09 185.2 U1 | 11/1987 |
| DE | 41 17 289 C1 | 12/1992 |
| DE | 197 43 826 A1 | 4/1999 |
| DE | 199 44 533 A1 | 4/2001 |
| GB | 2 358 240 | 7/2001 |

OTHER PUBLICATIONS

Copy of Search Report from German Patent Office on priority patent application.

* cited by examiner

Primary Examiner—Stephen Husar
(74) Attorney, Agent, or Firm—Technoprop Colton LLC (57) ABSTRACT

A lighting installation, in particular a danger light, obstruction light or daytime and night-time marker, having at least one luminaire and at least one lighting device arranged in a housing of the luminaire, with the lighting device being in the form of a ring or part of a ring and defining a ring axis, the lighting device being assigned at least a first, wholly or partially encircling reflector surface, which defines an axis of rotation, and the ring axis and axis of rotation run essentially parallel to one another or even coaxially with one another.

19 Claims, 6 Drawing Sheets

LIGHTING INSTALLATION, IN PARTICULAR AS A DANGER LIGHT, OBSTRUCTION LIGHT OR DAYTIME AND NIGHT-TIME MARKER

DESCRIPTION

The invention relates to a lighting installation, in particular as a danger light, obstruction light or daytime and night-time marker, having at least one luminaire, at least one lighting means being arranged in a housing of the luminaire. The lighting installations in this case are preferably for aviation obstructions, offshore installations or landing strips, for example wind rotors, multi-story buildings, viaducts, towers, drilling platforms or helipads.

Such lighting installations are intended to be visible from as far away as possible. At the same time, it is also possible for certain regions to remain blanked out. It is thus the case, for example, that luminaires on aviation obstructions only have to be visible to aircraft, but not for individuals beneath the aircraft obstructions. These individuals would be dazzled by the light emitted. It is intended, however, for the light to be emitted, as far as possible, in all the cardinal-point directions.

The object of the present invention is to provide a lighting installation which emits powerful light all the way round. For this purpose, the lighting installation according to the invention is defined by the following features:

a) the lighting means is in the form of a ring or part of a ring and defines a ring axis,
b) the lighting means is assigned at least a first, wholly or partially encircling reflector surface, which defines an axis of rotation,
c) the ring axis and axis of rotation run essentially parallel to one another or even coaxially with one another.

The abovementioned axes are preferably arranged vertically. Correspondingly, the light is emitted mainly at an angle to the abovementioned axes, in particular perpendicularly thereto. The reflector surface preferably penetrates at least partially into the annular lighting means.

The lighting installation is preferably designed as a flashing-light installation, with the luminaire in the form of a flashing luminaire and the lighting means in the form of a flashing lighting means. It is also then usually the case that an external or internal electronic circuit is provided for activating the flashing lighting means.

The reflector surface may be of concave form in relation to the lighting means. A parabolic cross section—even partly parabolic—in respect of a radial section of the reflector surface is particularly advantageous. This makes it possible to achieve good concentration of the light.

The reflector surface is advantageously curved such that the light beams emanating from the reflector surface and located in a plane parallel to the axis of rotation also run essentially parallel to one another. This makes it possible for the intensity of the light to be increased specifically in a certain region, while other regions have little or no light. In particular, the reflector surface is curved such that the light is reflected parallel to a plane. In this case, the plane is located preferably perpendicularly to the ring axis and/or axis of rotation. Correspondingly, this gives a high light intensity all the way round in the horizontal direction and little or no light beneath or above.

Two reflector surfaces arranged in a mirror-inverted manner in relation to one another are advantageously provided. These two reflector surfaces may merge into one another or be connected to one another. With the reflector surfaces in the form of part-parabolas or half-parabolas, combinations of two reflector surfaces give a whole parabola (in radial section). The lighting means is preferably arranged at the focal point of the parabola or at least in the vicinity of the focal point. A configuration with just a half-parabola is also possible. In this case too, the lighting means is preferably located in the vicinity of, or at, the focal point.

A further embodiment of the invention provides means by which encircling light emission is produced such that—starting from a plane perpendicular to the axis of rotation or ring axis—there is no light emission in a bottom region beneath the plane, there is pronounced light emission in a central region, which impinges on the plane, and there is a light intensity in a top region which decreases in relation to the central region. The central region is the main region and is preferably bounded in the downward direction by the plane and extends upward as far as an angle of approximately 3–5° above the plane. The bottom region should remain as dark as possible in order to avoid dazzling individuals who are in this region. The top region should likewise remain as dark as possible or else have a light intensity which decreases as the angle increases or have considerably poorer illumination overall than the central region.

If the abovementioned features are realized by a concentration of the light, this achieves considerable intensification for the central region. The light is visible from a relatively large distance. If the light is merely blocked out in the top and bottom regions, this at least avoids dazzling in these regions. It is also then possible to tell the location of the viewer relative to the luminaire. It is also expedient to combine measures for concentrating the light and for blocking out border regions. The transitions between the regions are thus more pronounced.

In order to achieve a screening action, a reflector surface—in particular the bottom of two reflector surfaces—may be curved upward in the outward direction approximately as far as a plane which is formed by the lighting means and is perpendicular to the ring axis. A region beneath the plane is specifically shielded or blocked out as a result.

The luminaire or lighting installation advantageously has a translucent covering in the manner of a tube. The cover may be highly transparent and is advantageously subdivided into three regions, namely a top region, a central region and a bottom region. In radial section, the central region is formed without curvature and is relatively narrow parallel to the ring axis. The ring axis preferably runs parallel to the longitudinal axis of the covering. The bottom and top regions of the covering are configured as a Fresnel lens with a smooth inner surface and profiled outer surface. The top and bottom regions are wide enough for the light which is emitted directly from the lighting means and is not reflected or shielded by the reflector surface to be refracted and passed on. The aim is all-round emission of the light within a small angle in relation to a plane perpendicular to the longitudinal axis of the covering. This ideally runs coaxially with the ring axis and/or axis of rotation.

A further advantageous embodiment of the invention provides two luminaires one above the other. It is possible for one luminaire to be swiveled in relation to the other or to be removed in some other way. The aim is to double the light intensity. In another application, one of the two luminaires emits red light as night-time light and the other luminaire emits white light as daytime light. It is also possible to combine the two luminaires—in a configuration as flashing luminaires—with briefly staggered activation in order to achieve visibly longer flashing times.

It is advantageously possible to adjust the reflector surface vertically in the housing. If two reflector surfaces are provided, both may be adjusted vertically, for example relative to the translucent covering.

The reflector surface—or both reflector surfaces—may be displaceable on a rod parallel to, or coaxial with, the axis of rotation. One possibility is a threaded rod on which a reflector body with a reflector surface is retained between adjustable nuts.

It is possible for the lighting means to be adjustable parallel to the axis of rotation or ring axis and relative to the reflector surface. In the case of two reflector surfaces, the adjustment preferably takes place relative to both.

The lighting means is preferably retained in the reflector surface. It is thus possible to provide in the reflector surface openings into which electrical contacts of the lighting means can pass. In the case of two reflector surfaces, the lighting means is preferably retained just in one reflector surface. It is also conceivable to provide two lighting means with coaxial ring axes and an extremely small distance between them. These two lighting means are preferably retained in in each case one reflector surface.

It is also possible for a plurality of LEDs to be arranged, as lighting means, in a ring. The LEDs (light emitting diodes) are retained on the reflector surface along an imaginary annular line or else are arranged on a separate annular holder which is positioned relative to the reflector surface (or to the two reflector surfaces).

Further features of the invention can be gathered from the claims and also from the description.

Exemplary embodiments of the invention are explained in more detail hereinbelow with reference to drawings, in which.

Figure 1:
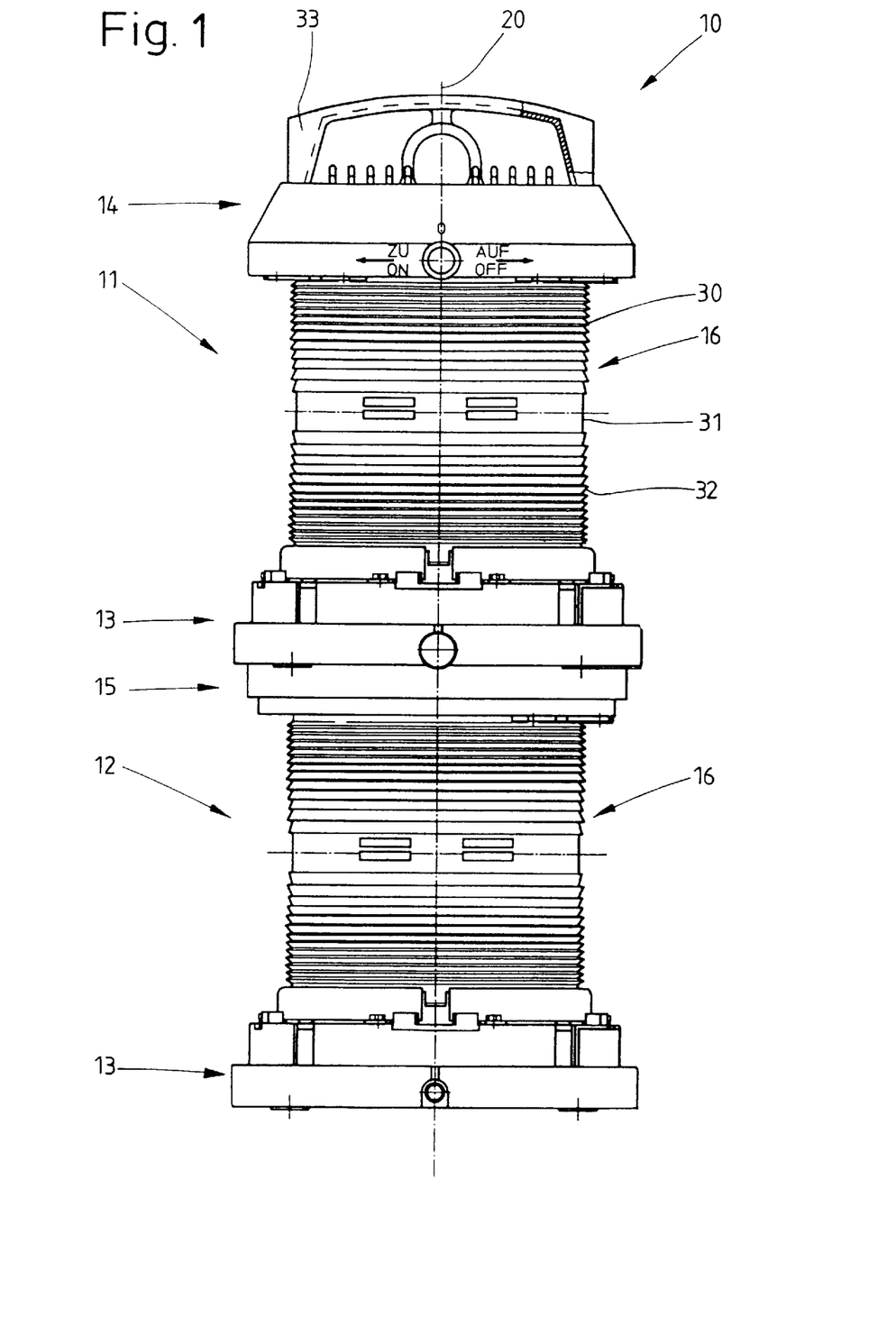
FIG. 1 shows a side view of a lighting installation with two luminaires.

FIG. 1 shows a lighting installation 10 according to the invention in the manner of a flashing-light installation. The lighting installation 10 here is formed from two flashing luminaires 11, 12 which are connected to one another. Each flashing luminaire 11, 12 has a housing with a bottom housing part 13 and a top housing part 14, 15. The top housing part 14 of the top flashing luminaire 11 here is configured somewhat differently to the top housing part 15 of the bottom flashing luminaire 12.

Figure 2:
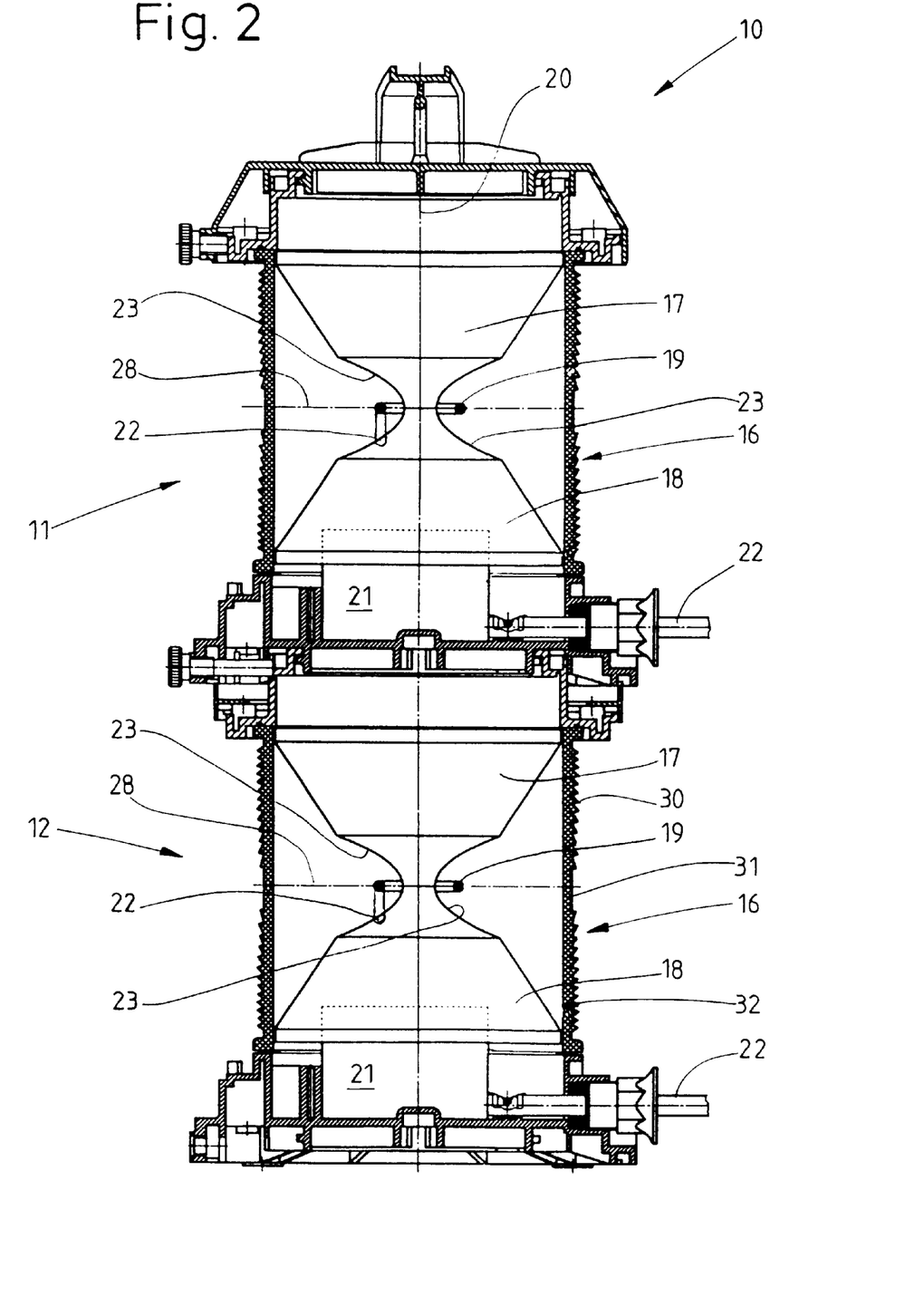
FIG. 2 shows a partial vertical section through the lighting installation according to FIG. 1.

Furthermore, each flashing luminaire 11, 12 is provided with a tubular, translucent covering 16, with two reflector bodies 17, 18 and with a flashing lighting means 19.

A vertical longitudinal axis 20 of the lighting installation 10 runs coaxially with a longitudinal axis of the coverings 16, with a ring axis defined by the annular flashing lighting means 19, and with an axis of rotation formed by the rotationally symmetrical reflector bodies 17, 18. In the present exemplary embodiment, all four abovementioned axes run coaxially to one another. Slight deviations are possible.

Xenon flash lamps are provided as the flashing lighting means 19. These lamps may be activated via a suitable electronic flashing unit 21 to give a flashing light which is sufficiently long for aviation obstructions. The electronic unit 21 is assigned to the bottom housing part 13 in each case, as is a power supply 22. The annular flashing lighting means 19 are retained precisely centrally between the top reflector body 17 and bottom reflector body 18, to be precise preferably in corresponding inlets 22 in the bottom reflector body 18.

Figure 3:
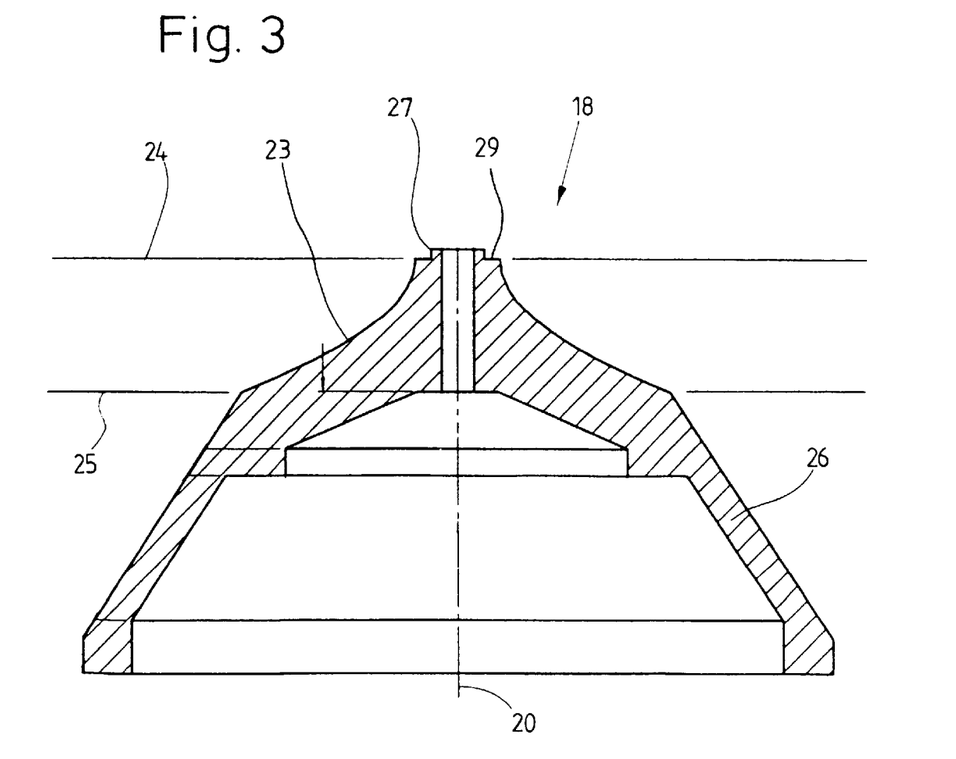
FIG. 3 shows a section through a reflector body, bearing a reflector surface, according to FIG. 2.

The reflector bodies 17, 18 are designed in a particular way. FIG. 3 shows a cross-sectional illustration. A reflector surface which is important for the functioning of the flashing luminaires 11, 12 is designated 23. The radial section thereof is in the form of a half-parabola branch, between the auxiliary lines 24 and 25 in FIG. 3. The reflector surface 23 is polished, silvered or rendered highly reflective in some other way. Overall, the reflector bodies 17, 18 are rotationally symmetrical components. Correspondingly, the reflector surface 23 is provided all the way round the axis of rotation (longitudinal axis 20). The reflector bodies 17, 18 preferably consist of aluminum or steel with the greatest wall thickness in the region of reflector surfaces 23. The reflector body 18 is in the form of an upside-down V with the smallest dimension transverse to the axis 20 in the top region—in mathematical terms, at the zero points of the abovementioned parabola branches (auxiliary line 24).

On the far side of the auxiliary line 25, that is to say in the widest region of the reflector body 18, the reflector surface 23 is adjoined by a likewise encircling bearing wall 26. The latter may have load-bearing and covering functions.

The two reflector bodies 17 and 18 butt against one another in the region of their narrowest cross sections. For this purpose, the reflector body 18 has, on its top side, an encircling protrusion 27, which passes into an encircling depression (not shown) of the adjacent reflector body 17. A separating line 28 between the two reflector bodies 17, 18 runs precisely along an encircling shoulder 29 beneath the protrusion 27.

The annular flashing lighting means 19 is arranged in the plane defined by the separating line 28.

The cover 16 is configured in a particular way, namely with a top region 30, a narrow central region 31 and a bottom region 32. The narrow central region has as good as no optical effect on the light beams emanating from the flashing lighting means. It is only the top region 30 and the bottom region 32 which are configured as encircling Fresnel lenses with a profiled outer side. Overall, the arrangements of the flashing lighting means 19, the curvature of the reflector surfaces 23 and the design and relative arrangement of the regions 30, 31 and 32 are selected such that the light emitted from the flashing luminaires 11, 12 is directed parallel to the separating line 28 and, with the flashing-light installation 10 arranged vertically, radiates mainly in the horizontal direction. The thickness of the flashing lighting means 19 and the (low) height of the central regions 31 result in a high light intensity in the region of 3–5° above the respective separating line 28 as far as approximately 3–5° beneath the respective separating line 28. In the regions outside the abovementioned 3–5°, the light intensity decreases to a pronounced extent—the greater the angle in relation to the separating line 28, the lower is the light intensity.

The top housing part 14 of the top flashing luminaire 11 is connected to the top reflector body 17 in a manner which is not shown. Once the top housing part 14 has been released (unscrewed), the covering 16 can be removed. A carrying handle 33 is arranged on top of the top housing part 14.

The top housing part 15 of the bottom flashing luminaire 12 is of somewhat flatter design and is envisaged for connecting to the bottom housing part 13 of the top flashing luminaire 11. Ideally, the bottom housing part 13 and the top housing part 15 are connected releasably to one another.

Each flashing luminaire 11, 12 is supplied individually with electric current. A supply line from the electronic flashing unit 21 to the flashing lighting means 19 is provided in a concealed manner in the bottom reflector body 18.

Figure 4:
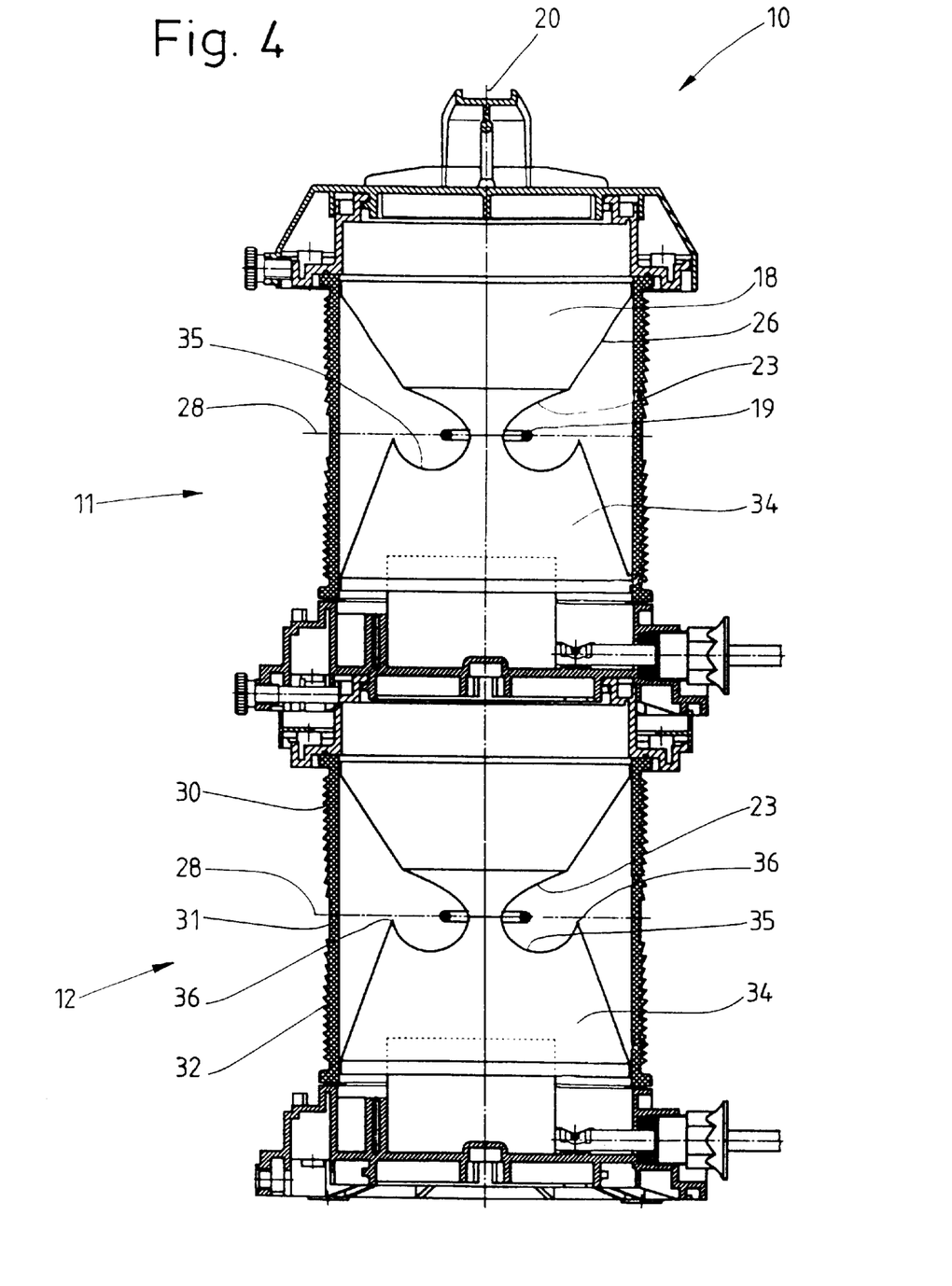
FIG. 4 shows a partial vertical section corresponding to FIG. 2, but for illustrating a second embodiment.

FIG. 4 shows an embodiment which has been modified in relation to FIG. 2. In contrast to the illustration in FIG. 2, specifically designed bottom reflector bodies 34 are provided here. As seen from the separating line 28, the reflector surface 35 of said reflector bodies, in radial section, is configured first of all in parabola form, but then is guided radially outward, in the direction of the separating line 28, up to the separating line 28. The reflector surface 35 terminates approximately centrally between the covering 16 and the assumed zero point of the parabola. The abovementioned end is formed by a point 36.

The particular effect of this configuration resides in the shielding of the region beneath the separating line 28. When the lighting installation is set up vertically, and the separating line 28 is correspondingly aligned horizontally, a particular light distribution is achieved, namely little or virtually no illumination beneath the separating line 28, (beneath a horizontal plane), pronounced illumination between the plane of the separating line 28 and an angle of approximately 3–5° above the same, and decreasing light intensity in a region thereabove.

In this embodiment from FIG. 4, it is also possible, for the purpose of improving the abovementioned effect, for that part of the covering 16 which is located beneath the separating line 28 to be of non-translucent design.

Figure 5:
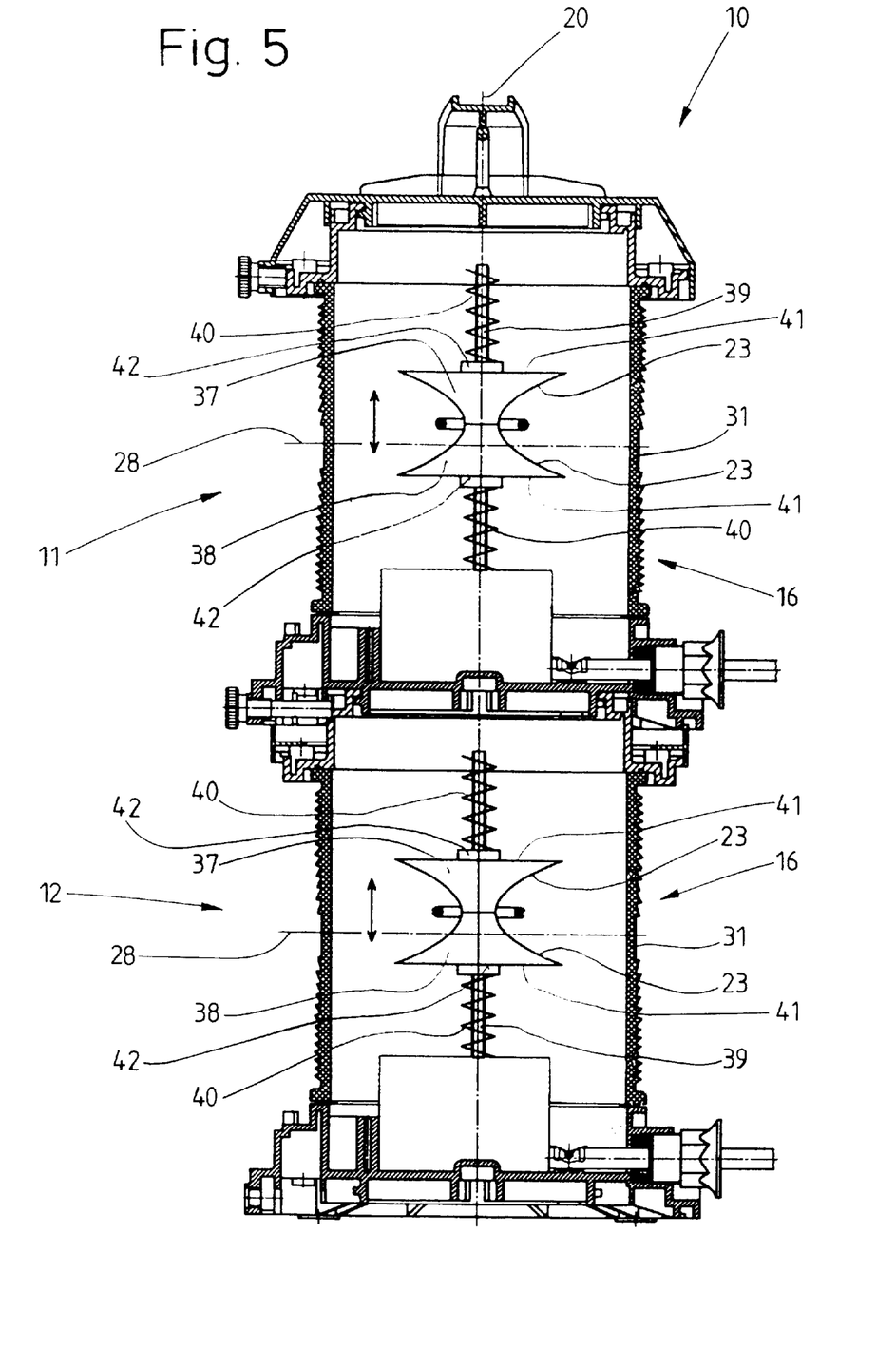
FIG. 5 shows a partial vertical section corresponding to FIG. 2, but for illustrating a third embodiment.

FIG. 5 shows a further alternative. Reflector surfaces 23 corresponding to FIG. 2 are provided here. The reflector bodies 37, 38 are of shortened design, without regions projecting axially beyond the reflector surfaces 23.

The reflector bodies 37, 38 are mounted, and retained in an axially adjustable manner, on axially directed rods 39 along the longitudinal axis 20. For this purpose, the springs 40, which are shown on the rods 39 in FIG. 5, are arranged above and beneath the reflector bodies 37, 38. A design in which the rods 39 contain a thread is expedient for adjustment. Each free side 41 of a reflector body 37, 38 is then assigned an adjusting nut 42, which can be rotated on the respectively associated rod 39 and thus allows axial displacement of the reflector bodies 37, 38. The aim is for the light distribution to be adjusted in as precise and fine-tuned a manner as possible relative to the central position of the separating line 28, and thus also to the central region 31 of the covering 16.

It is also possible for the embodiments of FIGS. 2, 4 and 5 to be intermixed. It is conceivable, for example, for the respectively bottom reflector body 38 in FIG. 5 to be designed with a reflector surface corresponding to the reflector surface 35 shown in FIG. 4.

Figure 6:
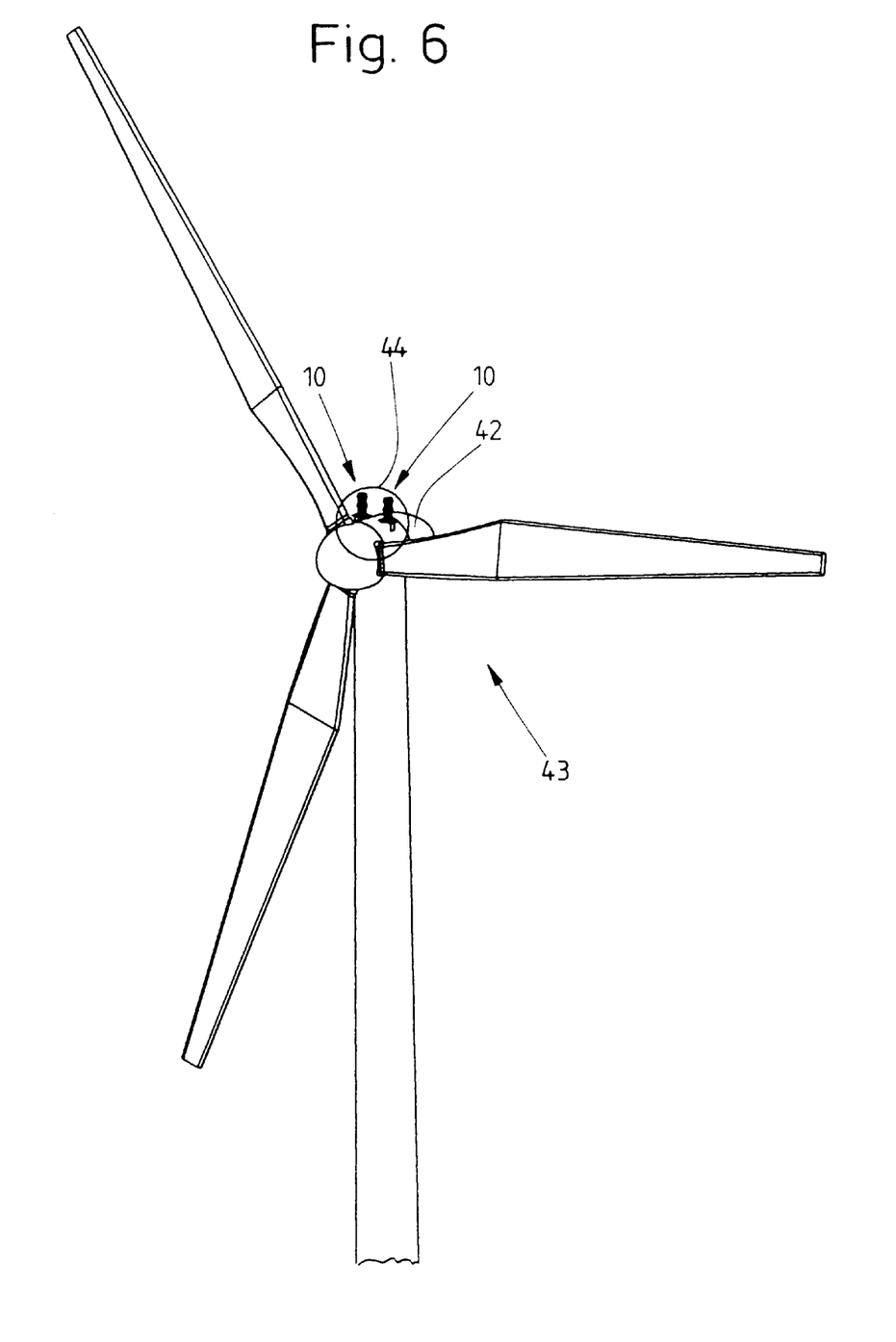
FIG. 6 shows a perspective illustration of a wind-rotor installation with two lighting installations arranged on a rotor-hub housing.

FIG. 6 shows the arrangement of two lighting installations 10 on a rotor-hub housing 42 of a wind rotor 43. The latter has, for example, a height of 85 m. The lighting installations 10 have an overall height of approximately 55 cm and are marked by a circle 44 in FIG. 6. The lighting installations 10 according to the invention satisfy the stringent international guidelines for flight safety ICAO annex 14.

What is claimed is:

1. A lighting installation (10) having at least one luminaire (11,12), at least one lighting means (19), at least one reflector surface (23, 35) that at least partly encircles the at least one lighting means, and a housing for containing the at least one luminaire, the at least one lighting means, and the at least one reflector surface, wherein:
    a) the lighting means (19) is in the shape of at least part of a ring and defines a ring axis centrally therethrough,
    b) the lighting means (19) is assigned to at least a first of at least one reflector surfaces (23, 35), which defines an axis of rotation about the lighting means,
    c) the ring axis and the axis of rotation run essentially parallel to or coaxially with one another, and
    d) the first of the at least one reflector surfaces (23, 25) is structured such that light emitted from the lighting means (19) is reflected outwardly from the lighting installation primarily parallel to a plane perpendicular to the axis of rotation and the ring axis, with no light being reflected outwardly from the lighting installation in a bottom region below the plane, and with light being reflected outwardly from the lighting installation in a top region above the plane having a decreasing light intensity from the plane as an angle of the emitted light above the plane increases relative to the plane.

2. The lighting installation as claimed in claim 1, wherein the luminaire is a flashing luminaire (11, 12) and the lighting means is a flashing lighting means (19).

3. The lighting installation as claimed in claim 1, wherein the first of the at least one reflector surface (23) has a concave curvature in relation to the lighting means (19) such that the emitted light is reflected primarily parallel to the plane perpendicular to the axis of rotation and the ring axis.

4. The lighting installation as claimed in claim 1, further comprising two luminaires (11, 12) arranged one above the other.

5. The lighting installation as claimed in claim 1, wherein the lighting means (19) is a plurality of light emitting diodes arranged in a ring-shaped arrangement.

6. A lighting installation (10) comprising at least one luminaire (11, 12), at least one lighting means (19), and at least one reflector surface (23, 35) arranged in a housing, wherein:
    a) the lighting means (19) is in the shape of at least part of a ring and defines a ring axis centrally therethrough;
    b) the lighting means (19) is assigned to at least a first of at least one reflector surfaces (23, 35), which defines an axis of rotation about the lighting means;
    c) the ring axis and the axis of rotation run essentially parallel to or coaxially with each other; and
    d) the first of the at least one reflector surfaces (23, 35) has a height that is adjustable.

7. The lighting installation as claimed in claim 6, wherein the at least one reflector surface (23, 35) is displaceable along a rod (39) parallel to or coaxial with the axis of rotation.

8. The lighting installation as claimed in claim 6, wherein the at least one reflector surface (23, 35) has a concave curvature such that light emitted from the lighting means (19) is reflected parallel to a plane that runs perpendicular to the ring axis and axis of rotation.

9. The lighting installation as claimed in claim 6, wherein at least one of the at least two reflector surfaces is a bottom reflector surface (35) that is curved upward in the outward direction approximately as far as a plane that is formed by the lighting means (19) and that is perpendicular to the ring axis.

10. The lighting installation as claimed in claim 6, further comprising two luminaries (11, 12) that are arranged one above the other.

11. The lighting installation as claimed in claim 10, further comprising two reflector surfaces (23, 35), one of which is assigned to each of the two luminaries (11, 12) and that are arranged in mirror-inverted manner in relation to one another.

12. The lighting installation (10) as claimed in claim 6, wherein the lighting means (19) is a plurality of light emitting diodes arranged in a ring-shaped arrangement.

13. The lighting installation (10) as claimed in claim 8, wherein the first of the at least one reflector surfaces (23, 25) is structured such that light emitted from the lighting means (19) is reflected outwardly from the lighting installation primarily parallel to a plane perpendicular to the axis of rotation and the ring axis, with no light being reflected outwardly from the lighting installation in a bottom region below the plane, and with light being reflective outwardly from the lighting installation in a top region above the plane having a decreasing light intensity from the plane as an angle of the emitted light above the plane increases relative to the plane.

14. A lighting installation comprising a first luminaire, a first reflector surface that at least partially encircles the first luminaire, and a first lighting means arranged in a housing, wherein:
 a) the first lighting means is in the shape of at least part of a ring and defines a ring axis centrally therethrough;
 b) the first lighting means is assigned to the first reflector surface, which defines an axis of rotation about the lighting means;
 c) the ring axis and the axis of rotation run essentially parallel to or coaxially with each other; and
 d) the first lighting means is held in the first reflected surface, wherein the first reflector surface has a height that is adjustable.

15. The lighting installation as claimed in claim 14, wherein the first reflector surface has a concave curvature such that light emitted from the first lighting means is reflected parallel to a plane that runs perpendicular to the ring axis and axis of rotation.

16. The lighting installation as claimed in claim 15, further comprising a second luminaire, a second lighting means in the shape of at least part of a ring and defines a ring axis centrally therethrough, and a second reflector surface, wherein the first and second luminaries are arranged one above the other, the second lighting means is assigned to the second reflector, and the first reflector surface and the second reflector surface are arranged in a mirro-inverted manner relative to each other.

17. The lighting installation as claimed in claim 16, wherein at least one of the first and second reflector surfaces is a bottom reflector surface that is curved upward in the outward direction approximately as far as a plane that is formed by the respective lighting means and that is perpendicular to the respective ring axis.

18. The lighting installation as claimed in claim 14, wherein the first lighting means is a plurality of light emitting diodes arranged in a ring-shaped arrangement.

19. The lighting installation as claimed in claim 17, wherein at least one of the first and second reflector surfaces is structured such that light emitted from the respective lighting means is reflected outwardly from the lighting installation primarily parallel to a plane perpendicular to the respective ring axis, with no light being reflected outwardly from the lighting installation in a bottom region below the plane, and with light being reflected outwardly from the lighting installation in a top region above the plane having a decreasing light intensity from the plane as an angle of the emitted light above the plane increases relative to the plane.

* * * * *